US005330823A

United States Patent [19]

Malhotra

[11] Patent Number: 5,330,823

[45] Date of Patent: Jul. 19, 1994

[54] TRANSPARENT RECORDING SHEETS

[75] Inventor: Shadi L. Malhotra, Mississauga, Canada

[73] Assignee: Xerox Corporation, Stamford, Conn.

[21] Appl. No.: 36,575

[22] Filed: Mar. 19, 1993

[51] Int. Cl.$^5$ .................................................. B32B 9/00

[52] U.S. Cl. .................................... 428/195; 428/206; 428/403; 428/407; 428/500; 428/522; 428/913

[58] Field of Search ............... 428/195, 206, 327, 913, 428/403, 407, 500, 522; 503/217

[56] References Cited

U.S. PATENT DOCUMENTS

| | | | |
|---|---|---|---|
| 3,488,189 | 1/1970 | Mayer et al. | 96/1.5 |
| 3,493,412 | 2/1970 | Johnston et al. | 117/17.5 |
| 3,561,337 | 2/1971 | Mulkey | 95/1 |
| 3,619,279 | 11/1971 | Johnston et al. | 117/155.4 UA |
| 3,850,641 | 11/1974 | Horigome et al. | 96/87 A |
| 3,944,711 | 3/1976 | Parent | 428/412 |
| 3,951,662 | 4/1976 | Chiba et al. | 96/84 R |
| 4,526,847 | 7/1985 | Walker et al. | 430/18 |
| 4,873,135 | 10/1989 | Wittnebel et al. | 428/192 |
| 4,956,225 | 9/1990 | Malhotra | 428/216 |
| 4,997,697 | 3/1991 | Malhotra | 428/195 |
| 5,118,570 | 4/1992 | Malhotra | 428/474.4 |
| 5,145,749 | 9/1992 | Matthew | 428/511 |
| 5,200,254 | 4/1993 | Henry et al. | 428/195 |
| 5,208,093 | 5/1993 | Carls et al. | 428/195 |

*Primary Examiner*—Patrick J. Ryan
*Assistant Examiner*—William A. Krynski
*Attorney, Agent, or Firm*—Judith L. Byorick

[57] ABSTRACT

Disclosed is a substantially transparent recording sheet which comprises (a) a substantially transparent substrate; (b) a binder polymer coated on the substrate; and (c) particles of an antistatic component, said particles being present on at least the surface of the binder polymer coating.

28 Claims, No Drawings

TRANSPARENT RECORDING SHEETS

BACKGROUND OF THE INVENTION

The present invention is directed to transparent sheets suitable for receiving images. More specifically, the present invention is directed to transparent recording sheets particularly suitable for use in electrophotographic imaging processes. One embodiment of the present invention is directed to a substantially transparent recording sheet which comprises (a) a substantially transparent substrate; (b) a binder polymer coated on the substrate; and (c) particles of an antistatic component, said particles being present on at least the surface of the binder polymer coating.

U.S. Pat. No. 5,118,570 (Malhotra) and U.S. Pat. No. 5,006,407 (Malhotra), the disclosures of each of which are totally incorporated herein by reference, disclose a transparency which comprises a hydrophilic coating and a plasticizer, which plasticizer can, for example, be from the group consisting of phosphates, substituted phthalic anhydrides, glycerols, glycols, substituted glycerols, pyrrolidinones, alkylene carbonates, sulfolanes, and stearic acid derivatives.

U.S. Pat. No. 5,145,749 (Matthew) discloses erasable coatings for xerography paper which comprise a pigment such as calcium carbonate in a binder such as an aqueous emulsion of an acrylic polymer. The erasability of the coating is improved by replacing at least 15 weight percent of the binder with a polyalkane or polyalkene wax, such as an aqueous emulsion of a polyolefin.

U.S. Pat. No. 4,526,847 (Walker et al.) discloses a transparency for the formation of an adherent electrostatic image thereon which includes a polyester resin film sheet having an image-receiving coating of nitrocellulose, a plasticizer, a particulate material, and, preferably, an antistatic agent. The coating is applied to the film sheet from a solvent mixture of an aliphatic ester or an aliphatic ketone, and an aliphatic alcohol.

U.S. Pat. No. 3,619,279 (Johnston et al.) discloses a toner receiving member having available at an external surface a solid crystalline plasticizer to reduce the fusion power requirements when toner is fused to the receiving member. The external surface of the toner receiving member is substantially free of material plasticizable by the solid crystalline plasticizer. Typically a plasticizer such as ethylene glycol dibenzoate may be available on the surface of paper.

U.S. Pat. No. 3,561,337 (Mulkey) discloses a sheet material having a transparent backing coated with a layer containing a polymeric binder and particles of solid material which is insoluble in the binder. The refractive index of the solid material varies from that of the binder by at most $\pm 0.6$. The surface of the layer is ink receptive and, by printing on that surface, a transparency is obtained.

U.S. Pat. No. 3,493,412 (Johnston et al.) discloses an imaging process wherein an electrostatic latent image is developed with a thermoplastic resin toner on an imaging surface and the toner image is transferred to an image receiving surface carrying an amount of a solid crystalline plasticizer sufficient to lower the toner fusion requirements when the toner image is fused to the receiving surface.

U.S. Pat. No. 3,488,189 (Mayer et al.) discloses the formation of fused toner images on an imaging surface corresponding to an electrostatic field by depositing on the imaging surface in image configuration toner particles containing a thermoplastic resin, the imaging surface carrying a solid crystalline plasticizer having a lower melting point than the melting range of the thermoplastic resin and heat fusing the resulting toner image.

U.S. Pat. No. 4,956,225 (Malhotra) discloses a transparency suitable for electrographic and xerographic imaging which comprises a polymeric substrate with a toner receptive coating on one surface thereof comprising blends selected from the group consisting of: poly(ethylene oxide) and carboxymethyl cellulose; poly(ethylene oxide), carboxymethyl cellulose, and hydroxypropyl cellulose; poly(ethylene oxide) and vinylidene fluoride/hexafluoropropylene copolymer; poly(chloroprene) and poly(alpha-methylstyrene); poly(caprolactone) and poly(alpha-methylstyrene); poly(vinyl isobutyl ether) and poly(alpha-methylstyrene); poly(caprolactone) and poly(p-isopropyl alpha-methylstyrene); blends of poly(1,4-butylene adipate) and poly(alpha-methylstyrene); chlorinated poly(propylene) and poly(alpha-methylstyrene); chlorinated poly(ethylene) and poly(alpha-methylstyrene); and chlorinated rubber and poly(alpha-methylstyrene). Also disclosed are transparencies with first and second coating layers.

U.S. Pat. No. 4,997,697 (Malhotra) discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

While known materials and processes are suitable for their intended purposes, a need remains for improved transparent recording sheets. In addition, a need remains for transparent recording sheets particularly suitable for use in conjunction with electrostatic toners. Further, there is a need for transparent recording sheets containing anti-static components and exhibiting improved adhesion of an electrostatic toner image to the recording sheet surface. Additionally, there is a need for transparent recording sheets containing anti-slip components and exhibiting improved adhesion of an electrostatic toner image to the recording sheet surface. There is also a need for transparent recording sheets wherein both an anti-static component and an anti-slip component are contained in a single coating layer of the sheet. Further, there is a need for transparent recording sheets wherein the sheets exhibit superior transparency characteristics subsequent to formation of an image thereon.

SUMMARY OF THE INVENTION

It is an object of the present invention to provide a transparent recording sheet with the above advantages.

It is another object of the present invention to provide improved transparent recording sheets.

It is yet another object of the present invention to provide transparent recording sheets particularly suitable for use in conjunction with electrostatic toners.

It is still another object of the present invention to provide transparent recording sheets containing antistatic components and exhibiting improved adhesion of an electrostatic toner image to the recording sheet surface.

Another object of the present invention is to provide transparent recording sheets containing anti-slip components and exhibiting improved adhesion of an electrostatic toner image to the recording sheet surface.

Yet another object of the present invention is to provide transparent recording sheets wherein both an antistatic component and an anti-slip component are contained in a single coating layer of the sheet.

Still another object of the present invention is to provide transparent recording sheets wherein the sheets exhibit superior transparency characteristics subsequent to formation of an image thereon.

These and other objects of the present invention (or specific embodiments thereof) can be achieved by providing a substantially transparent recording sheet which comprises (a) a substantially transparent substrate; (b) a binder polymer coated on the substrate; and (c) particles of an antistatic component, said particles being present on at least the surface of the binder polymer coating.

DETAILED DESCRIPTION OF THE INVENTION

The recording sheets of the present invention comprise a substantially transparent substrate or base sheet having a coating on one or both surfaces thereof. Any suitable substantially transparent substrate can be employed. Examples include polyesters, including Mylar TM, available from E.I. Du Pont de Nemours & Company, Melinex TM, available from Imperial Chemicals, Inc., Celanar TM, available from Celanese Corporation, polycarbonates such as Lexan TM, available from General Electric Company, polysulfones, such as those available from Union Carbide Corporation, polyether sulfones, such as those prepared from 4,4'-diphenyl ether, such as Udel TM, available from Union Carbide Corporation, those prepared from disulfonyl chloride, such as Victrex TM, available from ICI Americas Incorporated, those prepared from biphenylene, such as Astrel TM, available from 3M Company, poly (arylene sulfones), such as those prepared from crosslinked poly(arylene ether ketone sulfones), cellulose triacetate, polyvinylchloride cellophane, polyvinyl fluoride, polyimides, and the like, with polyester such as Mylar TM being preferred in view of its availability and relatively low cost. The substrate can be of any effective thickness. Typical thicknesses for the substrate are from about 50 to about 500 microns, and preferably from about 100 to about 125 microns, although the thickness can be outside these ranges.

Contained on one or both surfaces of the base sheet is a coating. This coating can be either coated directly onto the base sheet or coated onto another layer of material coated onto the base sheet previously, such as an antistatic layer, an anticurl layer, or the like. In one embodiment of the present invention, the coating comprises a binder polymer but contains no particles of an antistatic component; the antistatic particles are subsequently coated onto the binder layer. In another embodiment of the present invention, the coating comprises both a binder and particles of an antistatic component.

In the embodiment of the present invention wherein the substrate is coated with a mixture of binder and antistatic particles, the binder and antistatic particles are dispersed together in a solvent, preferably a polar solvent, such as methanol or the like, which is a relatively good solvent for the binder but a relatively poor solvent for the antistatic particles. Typically, the solvent is present in an amount of from about 50 to about 95 percent by weight, the binder is present in an amount of from about 2 to about 25 percent by weight, and the antistatic material is present in an amount of from about 1 to about 10 percent by weight, although the amounts can be outside these ranges. The dispersion is then applied to the substrate and the substrate is dried to yield the recording sheet.

In the embodiment of the present invention wherein the substrate is first coated with the binder and the binder is then coated with the antistatic particles, the binder is first coated onto the substrate by dispersing or dissolving it in a solvent, such as water, ethanol, methanol, acetone, dichloromethane, toluene, or the like, which is a relatively good solvent for the binder. Typically, the solvent is present in an amount of from about 50 to about 99 percent by weight and the binder material is present in an amount of from about 1 to about 50 percent by weight, although the relative amounts can be outside these ranges. The substrate is then dried. Subsequently, the antistatic particles are dispersed in a solvent, such as water, ethanol, methanol, acetone, or the like, which is a relatively good solvent for the antistatic material but a relatively poor solvent for the binder material. Typically, the solvent is present in an amount of from about 75 to about 99 percent by weight and the antistatic material is present in an amount of from about 1 to about 25 percent by weight, although the relative amounts can be outside these ranges. This solution or dispersion is then coated or sprayed onto the binder layer and dried to yield the recording sheet.

The terms "relatively good solvent" and "relatively poor solvent", as used herein, generally refer to the polymer solubility characteristics in a given solvent as related to viscosity, molecular weight, concentration, and temperature. At any given temperature, the viscosity of a solution of a polymer is related to the polymer's molecular weight by the Mark-Houwink-Sakurada equation as follows:

$$|\eta| = kM^{\alpha}$$

wherein $\eta$ is the intrinsic viscosity of the polymer in the solvent, k is a constant specific to each polymer/solvent combination, and M is the polymer molecular weight. The value of $\alpha$ is determined by dissolving a polymer with a given molecular weight in a solvent at a given temperature and at a selected concentration, measuring the viscosity of the solution, dissolving the same polymer in the same solvent at the same temperature at additional, different concentrations, measuring the viscosity of each additional solution, and plotting concentration versus viscosity. Extrapolating to zero concentration yields the intrinsic viscosity of the polymer at that molecular weight in the particular solvent at the given temperature. This process is then repeated at different molecular weights of the polymer to obtain a series of values for intrinsic viscosity at different molecular weights. Plotting intrinsic viscosity versus molecular weight then yields a line with a slope $\alpha$. The value of k can then be calculated for the polymer/solvent combination. For the purposes of the present invention, a solvent generally is a "relatively good solvent" for the selected material when the value of $\alpha$ is greater than 0.5 and generally is a "relatively poor solvent" for the selected material when the value of $\alpha$ is 0.5 or less. Further information regarding polymer solubility characteristics is disclosed in, for example, *Polymer Hand-*

*book,* 2nd Edition, J. Brandrup and E. H. Immergut, Eds., section 4, pages 1 et seq., John Wiley & Sons (1975), the disclosure of which is totally incorporated herein by reference.

In embodiments wherein the binder and the antistatic material are present in a single layer, this layer can be of any desired or effective thickness. Typically, this single layer is from about 3 to about 10 microns in thickness, although the thickness can be outside this range. In embodiments wherein the binder and the antistatic material are present in two layers, each layer can be of any desired or effective thickness. Typically, the binder layer is from about 1 to about 10 microns in thickness and the antistatic particle layer is from about 1 to about 5 microns in thickness, although the layer thicknesses can be outside these ranges.

The antistatic particles preferably are of an average particle diameter of less than about 5 micron, with the particle size typically being from about 0.5 to about 5 microns, and more preferably less than about 1 micron. Particles of the desired particle diameter can be obtained commercially. In addition, particles of the desired particle diameter can be obtained by recrystallization of the antistatic material from a solvent or by mechanical pulverization. For example, carboxymethyl cellulose, when dissolved in water and precipitated in methanol, or when dissolved in water and spray dried, provides dried particles of less than 1 micron in diameter; particles of carboxymethyl cellulose can also be obtained in average particle diameters of 2 to 3 microns by pulverizing or powdering processes such as ball milling.

Any suitable antistatic material can be employed. Preferably, the index of refraction of the antistatic material matches the index of refraction of the binder material as closely as possible, preferably to within $\pm 0.01$, and more preferably to within $\pm 0,005$, although the indices of refraction of the two materials may differ by more than these amounts. In embodiments wherein the antistatic particles are coated onto the binder layer, it is preferred that the antistatic material has a melting point of about 70° C. or less, and more preferably has a melting point of about 50° C. or less, although the melting point can be above these values. When the difference between index of refraction of the antistatic material and the index of refraction of the binder material is outside the above values, it is particularly preferred that the melting point of the antistatic material be about 70° C. or less, and when the melting point of the antistatic material is above about 70° C., it is particularly preferred that the difference between index of refraction of the antistatic material and the index of refraction of the binder material be no more than about $\pm 0.01$ to enable a desirable degree of transparency of the recording sheet. When the index of refraction of the binder material and the index of refraction of the antistatic material are within the above indicated values, the recording sheet is substantially transparent, both in the embodiment wherein the sheet is prepared by coating the substrate with a mixture of binder and antistatic particles and in the embodiment wherein the sheet is prepared by coating the substrate with the binder and subsequently coating the binder with the antistatic particles. When the index of refraction of the binder material and the index of refraction of the antistatic material are not within the above indicated values, the recording sheet may initially lack the desired degree of transparency; however, if the melting point of the antistatic material is less than about 70° C., the antistatic particles will tend to melt when the recording sheet is passed through the fusing system of an imaging device employing an electrostatic toner, and the resulting imaged sheet will generally exhibit the desired degree of transparency.

For the embodiment of the present invention wherein a mixture of a binder polymer and antistatic particles are coated onto the substrate in a single layer, and for embodiments wherein it is desired to match the index of refraction of the antistatic particles as closely as possible to the index of refraction of the binder material, preferred antistatic particles include polysaccharides and salts of polysaccharides. Examples of suitable antistatic materials particularly preferred for the embodiment of the invention wherein a mixture of a binder polymer and antistatic particles are coated onto the substrate in a single layer, and for embodiments wherein it is desired to match the index of refraction of the antistatic particles as closely as possible to the index of refraction of the binder material, include hydrophilic polysaccharides and their modifications, such as (1) starch (such as starch SLS-280, available from St. Lawrence starch), (2) cationic starch (such as Cato-72, available from National Starch), (3) hydroxyalkylstarch, wherein alkyl has at least one carbon atom and preferably wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (4) gelatin (such as Calfskin gelatin #00639, available from Poly Sciences Inc.), (5) alkyl celluloses and aryl celluloses, wherein alkyl has at least one carbon atom and preferably wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and preferably wherein the number of carbon atoms is such that the material is water soluble, preferably from 6 to about 20 carbon atoms, more preferably from 6 to about 10 carbon atoms, and even more preferably about 6 carbon atoms, such as phenyl, (6) hydroxy alkyl celluloses, wherein alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (7) alkyl hydroxy alkyl celluloses, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A.B. Sweden)), (8) hydroxy alkyl alkyl celluloses, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A.G.), hydroxypropyl methyl cellulose (Methocel K35LV, available from Dow Chemical Company), and hydroxy butylmethyl cellulose (such as HBMC, available from Dow Chemical Company)), (9) dihydroxyalkyl cellulose, wherein alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (10) hydroxy alkyl hydroxy alkyl cellulose, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (11) halodeoxycellulose, wherein halo represents a halogen atom (such as chlorodeoxycellulose, which can be prepared by the reaction of cellulose with sulfuryl chloride in pyridine at 25° C.), (12) amino deoxycellulose (which can be prepared by the reaction of chlorodeoxy cellulose with 19 percent alcoholic solution of ammonia for 6 hours at 160° C.), (13) dialkylammonium halide hydroxy alkyl cellulose, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as diethylammonium chloride hydroxy ethyl cellulose, available as Celquat H-100, L-200, National Starch and Chemical Company), (14) hydroxyalkyl trialkyl ammonium halide hydroxyalkyl cellulose, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as hydroxypropyl trimethyl ammonium chloride hydroxyethyl cellulose, available from Union Carbide Company as Polymer JR), (15) dialkyl amino alkyl cellulose, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (16) carboxyalkyl dextrans, wherein alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (17) dialkyl aminoalkyl dextran, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (18) amino dextran (available from Molecular Probes Inc), (19) carboxy alkyl cellulose salts, wherein alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethyl cellulose CMC 7HOF, available from Hercules Chemical Company), (20) gum arabic (such as #G9752, available from Sigma Chemical Company), (21) carrageenan (such as #C1013 available from Sigma Chemical Company), (22) karaya gum (such as #G0503, available from Sigma Chemical Company), (23) xanthan (such as Keltrol-T, available from Kelco division of Merck and Company), (24) chitosan (such as #C3646, available from Sigma Chemical Company), (25) carboxyalkyl hydroxyalkyl guar, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Auqualon Company), (26) cationic guar (such as Celanese Jaguars C-14-S, C-15, C-17, available from Celanese Chemical Company), (27) n-carboxyalkyl chitin, wherein alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (28) dialkyl ammonium hydrolyzed collagen protein, wherein alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like (such as dimethyl ammonium hydrolyzed collagen protein, available from Croda as Croquats), (29) agar-agar (such as that available from Pfaltz and Bauer Inc), (30) cellulose sulfate salts, wherein the cation is any conventional cation, such as sodium, lithium, potassium, calcium, magnesium, or the like (such as sodium cellulose sulfate #023 available from Scientific Polymer Products), and (31) carboxyalkylhydroxyalkyl cellulose salts, wherein each alkyl has at least one carbon atom and preferably wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethylhydroxyethyl cellulose CMHEC 43H and 37L available from Hercules Chemical Company), and the like, as well as blends or mixtures of any of the above. Any mixtures of the above antistatic materials in any relative amounts can be employed. The antistatic particles can comprise blends of two or more different materials. In addition, particles of one material or blend of materials can be admixed with particles of another material or blend of materials in the recording sheets of the present invention.

For the embodiment of the present invention wherein a binder is first coated onto the substrate, followed by coating the antistatic particles onto the binder, and for embodiments wherein it is desired that the melting point of the antistatic particles be about 70° C. or below, preferred antistatic materials include alkane amines and cationic quaternary salts of ammonia, phosphorus, pyridine, imidazoline, and the like, particularly those which are soluble in fast evaporating solvents, such as methanol or acetone. Examples of suitable antistatic materials particularly preferred for the embodiment of the invention wherein a binder is first coated onto the substrate, followed by coating the antistatic particles onto the binder, and for embodiments wherein the melting point is desired to be about 70° C. or below, include (1) benzyl dimethyl tetradecyl ammonium chloride dihydrate (mp 63°-65° C.) (Aldrich 29,279-6), (2) benzyl dimethyl stearyl ammonium chloride monohydrate (mp 67°-69° C.) (Aldrich 22,901-6), (3) cetyl pyridinium bromide monohydrate (mp 66°-68° C.) (Aldrich 28,531-5), (4) dodecyl pyridinium chloride monohydrate (mp 66°-70° C.) (Aldrich 27,860-2), (5) hexadecyl tributyl phosphonium bromide (mp 57°-60° C.) (Aldrich 27,620-0), (6) 1,12-diaminododecane (mp 69° C.) (Aldrich D1,640-1), (7) stearyl tributyl phosphonium bromide (mp 70° C.) (Aldrich 29,303-2), (8) benzyl dodecyl dimethyl ammonium bromide (mp 46°-48° C.) (Aldrich 28,088-7), (9) tetrabutyl ammonium chloride hydrate (mp 44° C.) (Aldrich 34,585-7), (10) 1,8-diamino octane (mp 50° C.) (Aldrich D2,240-1), (11 ) benzyl cetyl dimethyl ammonium chloride monohydrate (mp 62°-64° C.) (Aldrich 22,900-8), and the like, as well as blends or mixtures of any of the above. Any mixtures of the above antistatic materials in any relative amounts can be employed. The antistatic particles can comprise blends of two or more different materials. In addition, particles of one material or blend of materials can be admixed with particles of another material or blend of materials in the recording sheets of the present invention. Further examples of suitable antistatic materials include those disclosed in copending application U.S. Ser. No. 08/034,917, entitled "Recording Sheets Containing Phosphonium Compounds," with the named inventors Shadi L. Malhotra, Brent S. Bryant, and Doris K. Weiss, filed concurrently herewith, copending application U.S. Ser. No. 08/034,943, entitled "Recording Sheets Containing Cationic Sulfur Compounds," with the named inventors Shadi L. Malhotra and Brent S. Bryant, filed concurrently herewith, copending application U.S. Ser. No. 08/033,917, entitled "Recording Sheets Containing Pyridinium Compounds," with the named inventors Shadi L. Malhotra and Brent S. Bryant filed concurrently herewith copending application U.S. Ser. No. 08/034,445, entitled "Recording Sheets Containing Monoammonium Compounds," with the named inventors Shadi L. Malhotra, Brent S. Bryant, and Doris K. Weiss, filed concurrently herewith, copending application U.S. Ser. No. 08/033,918, entitled "Recording Sheets Containing Tetrazolium, Indolinium, and Imidazolinium Compounds," with the named inventors Shadi L. Malhotra, Brent S. Bryant, and Doris K. Weiss, filed concurrently herewith and copending application U.S. Ser. No. 08/033,932, entitled "Recording Sheets," with the named inventors Shadi L. Malhotra and Brent S. Bryant, filed concurrently herewith, the disclosures of each of which are totally incorporated herein by reference.

Any suitable binder can be employed. Examples of binder materials particularly preferred for the embodiment of the invention wherein a mixture of a binder polymer and antistatic particles are coated onto the substrate in a single layer, and for embodiments wherein it is desired to match the index of refraction of the antistatic particles as closely as possible to the index of refraction of the binder material, preferred binder materials include alcohol soluble polymers, such as those polymers soluble in methanol, including polyacrylic acid, such as #598, #599, #600, #413, available from Scientific Polymer Products, poly (hydroxyalkyl methacrylates), wherein alkyl has from 1 to about 18 carbon atoms, including methyl, ethyl, propyl, butyl, hexadecyl, and the like, including poly(2-hydroxyethylmethacrylate), such as #414, #815, available from Scientific Polymer Products, and poly(hydroxypropylmethacrate), such as #232 available from Scientific Polymer Products, poly (hydroxyalkylacrylates), wherein alkyl is methyl, ethyl, or propyl, including poly(2-hydroxyethyl acrylate), such as #850, available from Scientific Polymer Products, and poly(hydroxypropyl acrylate), such as #851, available from Scientific Polymer Products, poly(vinyl butyral), such as #043, #511, #507, available from Scientific Polymer Products, alkyl cellulose or aryl cellulose, wherein alkyl is methyl, ethyl, propyl, or butyl and aryl is phenyl or the like, including ethyl cellulose such as Ethocel N-22, available from Hercules Chemical Company, poly (vinylacetate), such as #346, #347, available from Scientific Polymer Products, and the like; ketone soluble polymers, such as those polymers soluble in acetone, including hydroxyalkyl cellulose acrylates and hydroxyaryl cellulose acrylates, wherein alkyl is methyl, ethyl, propyl, or butyl and aryl is phenyl or the like, including hydroxyethyl cellulose acrylate, such as #8630, available from Monomer-Polymer and Dajac Laboratories Inc., hydroxyalkyl cellulose methacrylates and hydroxyaryl cellulose methacrylates, wherein alkyl is methyl, ethyl, propyl, or butyl and aryl is phenyl or the like, including hydroxyethyl cellulose methacrylate, such as #8631, available from Monomer-Polymer and Dajac Laboratories Inc., cellulose-acrylamide adducts, such as #8959, #8960, #8961, #8962, available from Monomer-Polymer and Dajac Laboratories, Inc., poly (vinyl butyral), such as #043, #511, #507, available from Scientific Polymer Products, cyanoethylated cellulose, such as #091, available from Scientific Polymer Products, cellulose acetate hydrogen phthalate, such as #085, available from Scientific Polymer Products, hydroxypropylmethyl cellulose phthalate, such as HPMCP, available from Shin-Etsu Chemical, cellulose triacetate, such as #031, available from Scientific Polymer Products, poly (α-methylstyrene), such as #309, available from Scientific Polymer Products, styrene-butadiene copolymers, such as Kraton G-1652, Kraton DX-1150, and Kraton elastomer (such as D1107, G-1657, G-1657/FG1901, D-1101, FG1901, available from Shell Corporation), styrene-butylmethacrylate copolymers, such as #595, available from Scientific Polymer Products, vinyl chloride-vinylacetate-vinyl alcohol terpolymers, such as #428, available from Scientific Polymer Products, chlorinated solvent soluble polymers, such as poly (p-phenylene ethersulfone) (such as #392, available from Scientific Polymer Products), polysulfones, such as #046, available from Scientific Polymer Products, aromatic ester carbonate copolymers, such as APE KLI-9306, APE KLI-9310, available from Dow Chemical Company, poly carbonates, such as #035, available from Scientific Polymer Products, α-methylstyrenedimethylsiloxane block copolymers, such as PS 0965, available from Petrarch Systems, dimethyl siloxane-bisphenol A carbonate block copolymers, such as PSO99, available from Petrarch Systems, poly (2,6-dimethyl p-phenylene oxide), such as #126, available from Scientific Polymer Products, poly (2,4,6-tribromostyrene), such as #166, available from Scientific Polymer Products, ethylene-maleic anhydride copolymers, such as #2308, available from Polysciences, Inc., also available as EMA from Monsanto Chemical Co., and the like, as well as blends or mixtures of any of the above. Any mixtures of the above binder materials in any relative amounts can be employed.

Examples of binder materials particularly preferred for the embodiment of the invention wherein a binder is first coated onto the substrate, followed by coating the antistatic particles onto the binder include latex polymers, such as (1) cationic, anionic, and nonionic styrene-butadiene latexes (such as that available from Gen Corp Polymer Products, such as RES 4040 and RES 4100, available from Unocal Chemicals, and such as DL 6672A, DL6638A, and DL6663A, available from Dow Chemical Company), (2) ethylene-vinylacetate latex (such as Airflex 400, available from Air Products and Chemicals Inc.), and (3) vinyl acetate-acrylic copolymer latexes (such as synthemul 97-726, available from Reichhold Chemical Inc, Resyn 25-1110 and Resyn 25-1140, available from National Starch Company, and RES 3103 available from Unocal Chemicals; maleic anhydride and maleic acid containing polymers, such as (1) styrene-maleic anhydride copolymers (such as that available as Scripset from Monsanto, and the SMA series available from Arco), (2) vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ether-maleic anhydride copolymer #173, available from Scientific Polymer Products), (3) alkylene-maleic anhydride copolymers, wherein alkylene has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), (4) butadiene-maleic acid copolymers (such as #07787, available from Poly Sciences Inc.), (5) vinylalkylether-maleic acid copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporation as Gantrez S-95), and (6) alkyl vinyl ether-maleic acid esters, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ether-maleic acid ester #773, available from Scientific Polymer Products); alcohol soluble polymers, such as those polymers soluble in methanol, including polyacrylic acid, such as #598, #599, #600, #413, available from Scientific Polymer Products, poly (hydroxyalkyl methacrylates), wherein alkyl has from 1 to about 18 carbon atoms, including methyl, ethyl, propyl, butyl, hexadecyl, and the like, including poly(2-hydroxyethylmethacrylate), such as #414, #815, available from Scientific Polymer Products, and poly(hydroxypropylmethacrate), such as #232 available from Scientific Polymer Products, poly (hydroxyalkylacrylates), wherein alkyl is methyl, ethyl, or propyl, including poly(2-hydroxyethyl acrylate), such as #850, available from Scientific Polymer Products, and poly(hydroxypropyl acrylate), such as #851, available from Scientific Polymer Products, poly(vinyl butyral), such as #043, #511, #507, available from Scientific Polymer Products, alkyl cellulose or aryl cellulose, wherein alkyl is methyl, ethyl, propyl, or butyl and aryl is phenyl or the like, including ethyl cellulose such as Ethocel N-22, available from Hercules Chemical Company, poly (vinylacetate), such as #346, #347, available from Scientific Polymer Products, and the like; ketone soluble polymers, such as those polymers soluble in acetone, including hydroxyalkyl cellulose acrylates and hydroxyaryl cellulose acrylates, wherein alkyl is methyl, ethyl, propyl, or butyl and aryl is phenyl or the like, including hydroxyethyl cellulose acrylate, such as #8630, available from Monomer-Polymer and Dajac Laboratories Inc., hydroxyalkyl cellulose methacrylates and hydroxyaryl cellulose methacrylates, wherein alkyl is methyl, ethyl, propyl, or butyl and aryl is phenyl or the like, including hydroxyethyl cellulose methacrylate, such as #8631, available from Monomer-Polymer and Dajac Laboratories Inc., cellulose-acrylamide adducts, such as #8959, #8960, #8961, #8962, available from Monomer-Polymer and Dajac Laboratories, Inc., poly (vinyl butyral), such as #043, #511, #507, available from Scientific Polymer Products, cyanoethylated cellulose, such as #091, available from Scientific Polymer Products, cellulose acetate hydrogen phthalate, such as #085, available from Scientific Polymer Products, hydroxypropylmethyl cellulose phthalate, such as HPMCP, available from Shin-Etsu Chemical, cellulose triacetate, such as #031, available from Scientific Polymer Products, poly (α-methylstyrene), such as #309, available from Scientific Polymer Products, styrene-butadiene copolymers, such as Kraton G-1652, Kraton DX-1150, and Kraton elastomer (such as D1107, G1657, G-1657/FG1901, D-1101, FG1901, available from Shell Corporation), styrene-butylmethacrylate copolymers, such as #595, available from Scientific Polymer Products, vinyl chloride-vinylacetate-vinyl alcohol terpolymers, such as #428, available from Scientific Polymer Products, chlorinated solvent soluble polymers, such as poly (p-phenylene ether-sulfone) (such as #392, available from Scientific Polymer Products), polysulfones, such as #046, available from Scientific Polymer Products, aromatic ester carbonate copolymers, such as APE KLI-9306, APE KLI-9310, available from Dow Chemical Company, poly carbonates, such as #035, available from Scientific Polymer Products, α-methylstyrenedimethylsiloxane block copolymers, such as PS 0965, available from Petrarch Systems, dimethyl siloxane-bisphenol A carbonate block copolymers, such as PSO99, available from Petrarch Systems, poly (2,6-dimethyl p-phenylene oxide), such as #126, available from Scientific Polymer Products, poly (2,4,6-tribromostyrene), such as #166, available from Scientific Polymer Products, and the like, as well as blends or mixtures of any of the above. Any mixtures of the above binder materials in any relative amounts can be employed.

In the recording sheets of the present invention, both those prepared by coating a mixture of binder and antistatic particles in a single layer onto the substrate and those prepared by first coating a binder onto the substrate and subsequently coating the antistatic particles onto the binder, the antistatic particles can also function as anti-slip components, thereby enhancing the feeding of these sheets through the paper path in an imaging apparatus. Accordingly, while additional anti-slip agents, such as silica particles or the like, can, if desired, be added to the recording sheets of the present invention, such additional additives are not necessary.

The coating or coatings on the substrate of the recording sheets of the present invention can be applied to the substrate by any suitable technique. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 25 to about 100° C. in an air drier.

Recording sheets of the present invention can be employed in printing and copying processes wherein dry or liquid electrophotographic-type developers are employed, such as electrophotographic processes, ionographic processes, or the like. Yet another embodiment of the present invention is directed to a process for generating images which comprises generating an electrostatic latent image on an imaging member in an imaging apparatus; developing the latent image with a toner; transferring the developed image to a recording sheet of the present invention; and optionally permanently affixing the transferred image to the recording sheet. Still another embodiment of the present invention is directed to an imaging process which comprises generating an electrostatic latent image on a recording sheet of the present invention; developing the latent image with a toner; and optionally permanently affixing the developed image to the recording sheet. Electrophotographic processes are well known, as described in, for example, U.S. Pat. No. 2,297,691 to Chester Carlson. Ionographic and electrographic processes are also well known, and are described in, for example, U.S. Pat. Nos. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, and 4,155,093, the disclosures of each of which are totally incorporated herein by reference.

The recording sheets of the present invention can also be used in any other printing or imaging process, such as printing with pen plotters, handwriting with ink pens, offset printing processes, or the like, provided that the ink employed to form the image is compatible with the ink receiving layer of the recording sheet.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Twenty transparent recording sheets were prepared by a dip coating process (both sides coated in one operation) by providing Mylar® base sheets in cut sheet form (8.5×11.0 inches) in a thickness of 100 microns and coating the base sheets with a dispersion comprising 90 percent by weight ethylene-maleic anhydride copolymer (#2308 obtained from Poly Sciences Inc., refractive index (RI) of 1.52) and 10 percent by weight sodium carboxymethyl cellulose (CMC 7HOF, mp>200° C., obtained from Hercules Chemical Company, RI=1.52, 5 micron particles obtained commercially were ball-milled to obtain average particle diameters of about 1 to 2 microns), which dispersion was present in a concentration of 5 percent by weight of methanol. Subsequent to air drying at 80° C. for a period of 10 minutes and monitoring the difference in weight prior to and subsequent to coating, the dried sheets were each coated with 0.3 grams, 3 microns in thickness (on each side) of the polymeric layer containing sodium carboxymethyl cellulose particles which functioned as an antistatic agent and as a traction (anti-slip) agent. These sheets were then fed individually into a Xerox® 1038 black imaging apparatus and images were obtained with an average optical density of 1.30 (black). These images had 96.1 percent of the toner remaining fixed (TF %) to the substrate subsequent to a 3M Scotch® tape lift-off test, as determined by the optical density of the images before and after applying the tape to the toner images and peeling it off.

Additional transparency sheets were prepared by the same process with the binder materials and antistatic polymer particle materials indicated in the Table below, with the following results:

Optical Density of Images on Transparencies Imaged with Xerox 1038 copier

| Coating Composition (Single Layer Structure) | Optical density Before | After | TF % |
|---|---|---|---|
| ethylene-maleic anhydride copolymer (Poly Sciences #2308, RI = 1.52) 90% by wt.; sodium carboxymethyl cellulose (CMC 7HOF, Hercules Chemical Company) 10% by wt. (5% by wt. methanol solution) | 1.3 | 1.25 | 96.1 |
| butadiene-maleic anhydride copolymer (Poly Sciences #07787, RI = 1.51) 90% by wt.; sodium carboxymethyl hydroxyethyl cellulose (CMHEC 37L, Hercules Chemcial Company, RI = 1.51) 10% by wt. (5% by wt. methanol solution) | 1.28 | 1.25 | 97.6 |

-continued

| Optical Density of Images on Transparencies Imaged with Xerox 1038 copier | | | |
|---|---|---|---|
| Coating Composition | Optical density | | |
| (Single Layer Structure) | Before | After | TF % |
| 2-hydroxyethyl methacrylate (#414, Scientific Polymer Products, RI = 1.51) 90% by wt.; diethyl ammonium chloride hydroxyethyl cellulose (Celquat L-200, National Starch, RI = 1.51) 10% by wt. (5% by wt. methanol solution) | 1.25 | 1.20 | 96.0 |

EXAMPLE II

Twenty transparent recording sheets were prepared by a dip coating process (both sides coated in one operation) by providing Mylar ® base sheet in cut sheet form (8.5×11.0 inches) in a thickness of 100 microns and coating the base sheet with a vinyl acrylic terpolymer latex (RES 3103, obtained from Unocal Chemicals), which latex was present in a concentration of 20 percent by weight in water. Subsequent to air drying at 100° C. for a period of 30 minutes and monitoring the weight prior to and subsequent to coating, the dried sheets were each coated with 0.4 grams 4 microns in thickness (on each side) of the vinyl-acrylic terpolymer. These dried first coating layers were then overcoated with a solution of tetrabutyl ammonium chloride hydrate (#34,585-7, obtained from Aldrich Chemical Company, mp=44° C.), which solution was present in a concentration of 2 percent by weight in methanol. Subsequent to air drying the two layered two-sided coated transparency sheets at 25° C. for a period of 30 minutes and monitoring the weight prior to and subsequent to coating, the dried vinyl-acrylic terpolymer toner receiving layer was overcoated with 0.2 grams, 2.0 microns in thickness (each side) of a low melt antistatic and anti-slip powder layer wherein the particles were less than 1 micron in average particle diameter. These sheets were then fed individually into a Xerox ® 1038 black imaging apparatus and images were obtained with an average optical density of 1.35 (black). These images had 96.3 percent of the toner fixed as determined by a 3M Scotch ® tape toner lift off test.

Additional transparency sheets were prepared by the same process with the binder materials and antistatic particle materials indicated in the Table below, wherein each antistatic material was coated onto the binder layer from a 2 percent by weight solution in methanol and each binder layer was coated onto the substrate as a water-based latex containing 20 percent by weight solids, with the following results:

| Optical Density of Images on Transparencies Imaged with Xerox 1038 copier | | | | |
|---|---|---|---|---|
| Coating Composition | | Optical density Black | | |
| First layer (binder) on base sheet | Second layer (antistatic) particles) on binder | Before | After | TF % |
| styrene-butadiene latex (RES 4100 Unocal Chemicals, RI = 1.5373) | benzyl dodecyl dimethyl ammonium bromide (Aldrich 28,088-7, RI = 1.4506, mp = 46-48° C.) | 1.33 | 1.28 | 96.2 |
| vinyl-acrylic terpolymer latex (RES 3103 from Unocal Chemicals RI = 1.4665) | tetra butyl ammonium chloride hydrate (Aldrich 34,585-7, RI = 1.4680, mp = 44° C.) | 1.35 | 1.30 | 96.3 |
| polyester latex (Eastman AQ 29D) 50% by wt.; acrylic emulsion (Rhoplex B-15J from Rohm & Hass) 50% by wt.; RI = 1.5215 | 1,12-diamino dodecane (Aldrich DI,640-1 RI = 1.4612, mp - 69° C.) | 1.35 | 1.30 | 96.3 |
| acrylic-vinyl acetate copolymer (Rhoplex AR-74 from Rohm & Haas, RI = 1.4685) | 1,8-diamino octane (Aldrich D2,240-1, RI = 1,4588, mp = 50° C. | 1.35 | 1.35 | 100 |

(In the above Table, refractive indices (RI) of the solid materials were calculated based on the refractive index values of their liquid homologs; for example, the RI of 1,3-diaminopropane is 1.4570 and the RI of 1,5-diaminopentane is 1.4582, indicating a 0.0006 increment for each additional $-CH_2-$ group (source, Aldrich Chemicals). The RI values for the copolymeric binders were calculated as the sum of the RI values of homopolymers of each monomer, weighted for the percentage of each monomer in the copolymer; for example, the RI of polystyrene is 1.59 and the RI of polybutadiene is 1.52, so in a styrene-butadiene copolymer containing 75 percent by weight styrene and 25 percent by weight butadiene, the RI is 1.5375.)

Other embodiments and modifications of the present invention may occur to those skilled in the art subsequent to a review of the information presented herein; these embodiments and modifications, as well as equivalents thereof, are also included within the scope of this invention.

What is claimed is:

1. A substantially transparent recording sheet which comprises (a) a substantially transparent substrate; (b) a binder polymer coated on the substrate; and (c) particles of an antistatic component, said particles being present on at least the surface of the binder polymer coating, wherein at least one of the following three conditions is met: (1) the index of refraction of the binder and the index of refraction of the antistatic component differ by no more than about ±0.01; (2) the antistatic component has a melting point of about 70° C. or less; (3) the antistatic particles are of an average particle diameter of less than about 1 micron.

2. A recording sheet according to claim 1 wherein the antistatic particles are of an average particle diameter of less than about 5 microns.

3. A recording sheet according to claim 1 wherein the antistatic particles are of an average particle diameter of from about 0.5 to about 5 microns.

4. A recording sheet according to claim 1 wherein the antistatic particles are of an average particle diameter of less than about 1 micron.

5. A substantially transparent recording sheet which comprises (a) a substantially transparent substrate; (b) a binder polymer coated on the substrate; and (c) particles of an antistatic component, said particles being present on at least the surface of the binder polymer coating, wherein the index of refraction of the binder and the index of refraction of the antistatic component differ by no more than about $\pm 0.01$.

6. A recording sheet according to claim 5 wherein the index of refraction of the binder and the index of refraction of the antistatic component differ by no more than about $\pm 0.005$.

7. A recording sheet according to claim 1 wherein the antistatic component has a melting point of about 70° C. or less.

8. A recording sheet according to claim 1 wherein the antistatic component has a melting point of about 50° C. or less.

9. A recording material according to claim 1 wherein the antistatic component is selected from the group consisting of (1) starch, (2) cationic starch, (3) hydroxyalkylstarch, wherein alkyl has at least one carbon atom, (4) gelatin, (5) alkyl celluloses and aryl celluloses, wherein alkyl has at least one carbon atom and wherein aryl has at least 6 carbon atoms, (6) hydroxy alkyl celluloses, wherein alkyl has at least one carbon atom, (7) alkyl hydroxy alkyl celluloses, wherein each alkyl has at least one carbon atom, (8) hydroxy alkyl alkyl celluloses, wherein each alkyl has at least one carbon atom, (9) dihydroxyalkyl cellulose, wherein alkyl has at least one carbon atom, (10) hydroxy alkyl hydroxy alkyl cellulose, wherein each alkyl has at least one carbon atom, (11) halodeoxycellulose, wherein halo represents a halogen atom, (12) amino deoxycellulose, (13) dialkylammonium halide hydroxy alkyl cellulose, wherein each alkyl has at least one carbon atom and wherein halide represents a halogen atom, (14) hydroxyalkyl trialkyl ammonium halide hydroxyalkyl cellulose, wherein each alkyl has at least one carbon atom and wherein halide represents a halogen atom, (15) dialkyl amino alkyl cellulose, wherein each alkyl has at least one carbon atom, (16) carboxyalkyl dextrans, wherein alkyl has at least one carbon atom, (17) dialkyl aminoalkyl dextran, wherein each alkyl has at least one carbon atom, (18) amino dextran, (19) carboxy alkyl cellulose salts, wherein alkyl has at least one carbon atom, (20) gum arabic, (21) carrageenan, (22) karaya gum, (23) xanthan, (24) chitosan, (25) carboxyalkyl hydroxyalkyl guar, wherein each alkyl has at least one carbon atom, (26) cationic guar, (27) n-carboxyalkyl chitin, wherein alkyl has at least one carbon atom, (28) dialkyl ammonium hydrolyzed collagen protein, wherein alkyl has at least one carbon atom, (29) agar-agar, (30) cellulose sulfate salts, (31) carboxyalkylhydroxyalkyl cellulose salts, wherein each alkyl has at least one carbon atom, and (32) mixtures thereof.

10. A substantially transparent recording sheet which comprises (a) a substantially transparent substrate; (b) a binder polymer coated on the substrate; and (c) particles of an antistatic component, said particles being present on at least the surface of the binder polymer coating, wherein the antistatic component is selected from the group consisting of (1) benzyl dimethyl tetradecyl ammonium chloride dihydrate, (2) benzyl dimethyl stearyl ammonium chloride monohydrate, (3) cetyl pyridinium bromide monohydrate, (4) dodecyl pyridinium chloride monohydrate, (5) hexadecyl tributyl phosphonium bromide, (6) 1,12-diaminododecane, (7) stearyl tributyl phosphonium bromide, (8) benzyl dodecyl dimethyl ammonium bromide, (9) tetrabutyl ammonium chloride hydrate, (10) 1,8-diamino octane, (11) benzyl cetyl dimethyl ammonium chloride monohydrate, and (12) mixtures thereof.

11. A recording material according to claim 1 wherein the binder is selected from the group consisting of polyacrylic acid, poly (hydroxyalkyl methacrylates), wherein each alkyl has at least one carbon atom, poly (hydroxyalkylacrylates), wherein alkyl has at least one carbon atom, alkyl cellulose, wherein alkyl has at least one carbon atom, aryl cellulose, wherein aryl has at least six carbon atoms, hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, poly (vinyl butyral), cyanoethylated cellulose, cellulose acetate hydrogen phthalate, hydroxypropylmethyl cellulose phthalate, cellulose triacetate, poly ($\alpha$-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, $\alpha$-methylstyrene-dimethylsiloxane block copolymers, dimethyl siloxane-bisphenol A carbonate block copolymers, poly(2,6-dimethyl p-phenylene oxide), poly (2,4,6-tribromostyrene), ethylene-maleic anhydride copolymers, and mixtures thereof.

12. A recording material according to claim 1 wherein the binder is selected from the group consisting of cationic styrene-butadiene latexes, anionic styrene-butadiene latexes, nonionic styrene-butadiene latexes, ethylene-vinylacetate latexes, vinyl acetate-acrylic copolymer latexes, styrene-maleic anhydride copolymers, vinyl alkyl ether-maleic anhydride copolymers, wherein alkyl has at least one carbon atom, alkylene-maleic anhydride copolymers, wherein alkylene has at least one carbon atom, butadiene-maleic acid copolymers, vinylalkylether-maleic acid copolymers, wherein alkyl has at least one carbon atom, alkyl vinyl ether-maleic acid esters, wherein alkyl has at least one carbon atom, polyacrylic acid, poly (hydroxyalkyl methacrylates), wherein alkyl has at least one carbon atom, poly (hydroxyalkylacrylates), wherein alkyl has at least one carbon atom, poly(vinyl butyral), alkyl cellulose, wherein alkyl has at least one carbon atom, aryl cellulose, wherein aryl has at least six carbon atoms, poly (vinylacetate), hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, cellulose-acrylamide adducts, cyanoethylated cellulose, cellulose acetate hydrogen phthalate, hydroxypropylmethyl cellulose phthalate, cellulose triacetate, poly (α-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly (2,6-dimethyl p-phenylene oxide), poly (2,4,6tribromostyrene), and mixtures thereof.

13. A recording material according to claim 1 wherein the antistatic component is selected from the group consisting of (1) starch, (2) cationic starch, (3) hydroxyalkylstarch, wherein alkyl has at least one carbon atom, (4) gelatin, (5) alkyl celluloses and aryl celluloses, wherein alkyl has at least one carbon atom and wherein aryl has at least 6 carbon atoms, (6) hydroxy alkyl celluloses, wherein alkyl has at least one carbon atom, (7) alkyl hydroxy alkyl celluloses, wherein each alkyl has at least one carbon atom, (8) hydroxy alkyl alkyl celluloses, wherein each alkyl has at least one carbon atom, (9) dihydroxyalkyl cellulose, wherein alkyl has at least one carbon atom, (10) hydroxy alkyl hydroxy alkyl cellulose, wherein each alkyl has at least one carbon atom, (11) halodeoxycellulose, wherein halo represents a halogen atom, (12) amino deoxycellulose, (13) dialkylammonium halide hydroxy alkyl cellulose, wherein each alkyl has at least one carbon atom and wherein halide represents a halogen atom, (14) hydroxyalkyl trialkyl ammonium halide hydroxyalkyl cellulose, wherein each alkyl has at least one carbon atom and wherein halide represents a halogen atom, (15) dialkyl amino alkyl cellulose, wherein each alkyl has at least one carbon atom, (16) carboxyalkyl dextrans, wherein alkyl has at least one carbon atom, (17) dialkyl aminoalkyl dextran, wherein each alkyl has at least one carbon atom, (18) amino dextran, (19) carboxy alkyl cellulose salts, wherein alkyl has at least one carbon atom, (20) gum arabic, (21) carrageenan, (22) karaya gum, (23) xanthan, (24) chitosan, (25) carboxyalkyl hydroxyalkyl guar, wherein each alkyl has at least one carbon atom, (26) cationic guar, (27) n-carboxyalkyl chitin, wherein alkyl has at least one carbon atom, (28) dialkyl ammonium hydrolyzed collagen protein, wherein alkyl has at least one carbon atom, (29) agar-agar, (30) cellulose sulfate salts, (31) carboxyalkylhydroxyalkyl cellulose salts, wherein each alkyl has at least one carbon atom, and (32) mixtures thereof, and the binder is selected from the group consisting of polyacrylic acid, poly (hydroxyalkyl methacrylates), wherein each alkyl has at least one carbon atom, poly (hydroxyalkylacrylates), wherein alkyl has at least one carbon atom, alkyl cellulose, wherein alkyl has at least one carbon atom, aryl cellulose, wherein aryl has at least six carbon atoms, hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, poly (vinyl butyral), cyanoethylated cellulose, cellulose acetate hydrogen phthalate, hydroxypropylmethyl cellulose phthalate, cellulose triacetate, poly (α-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly(2,6-dimethyl p-phenylene oxide), poly (2,4,6-tribromostyrene), ethylene-maleic anhydride copolymers, and mixtures thereof.

14. A substantially transparent recording sheet which comprises (a) a substantially transparent substrate; (b) a binder polymer coated on the substrate; and (c) particles of an antistatic component, said particles being present on at least the surface of the binder polymer coating, wherein the antistatic component is selected from the group consisting of (1) benzyl dimethyl tetradecyl ammonium chloride dihydrate, (2) benzyl dimethyl stearyl ammonium chloride monohydrate, (3) cetyl pyridinium bromide monohydrate, (4) dodecyl pyridinium chloride monohydrate, (5) hexadecyl tributyl phosphonium bromide, (6) 1,12-diaminododecane, (7) stearyl tributyl phosphonium bromide, (8) benzyl dodecyl dimethyl ammonium bromide, (9) tetrabutyl ammonium chloride hydrate, (10) 1,8-diamino octane, (11) benzyl cetyl dimethyl ammonium chloride monohydrate, and (12) mixtures thereof, and the binder is selected from the group consisting of cationic styrene-butadiene latexes, anionic styrene-butadiene latexes, nonionic styrene-butadiene latexes, ethylene-vinylacetate latexes, vinyl acetate-acrylic copolymer latexes, styrene-maleic anhydride copolymers, vinyl alkyl ether-maleic anhydride copolymers, wherein alkyl has at least one carbon atom, alkylene-maleic anhydride copolymers, wherein alkylene has at least one carbon atom, butadiene-maleic acid copolymers, vinylalkylether-maleic acid copolymers, wherein alkyl has at least one carbon atom, alkyl vinyl ether-maleic acid esters, wherein alkyl has at least one carbon atom, polyacrylic acid, poly (hydroxyalkyl methacrylates), wherein alkyl has at least one carbon atom, poly (hydroxyalkylacrylates), wherein alkyl has at least one carbon atom, poly(vinyl butyral), alkyl cellulose, wherein alkyl has at least one carbon atom, aryl cellulose, wherein aryl has at least six carbon atoms, poly (vinylacetate), hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, cellulose-acrylamide adducts, cyanoethylated cellulose, cellulose acetate hydrogen phthalate, hydroxypropylmethyl cellulose phthalate, cellulose triacetate, poly (α-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly (2,6-dimethyl p-phenylene oxide), poly (2,4,6-tribromostyrene), and mixtures thereof.

15. A recording sheet according to claim 1 wherein the binder polymer and the antistatic particles are present as a mixture in a single layer.

16. A recording sheet according to claim 15 wherein the layer containing the binder material and the antistatic polymers is from about 3 to about 10 microns in thickness.

17. A substantially transparent recording sheet which comprises (a) a substantially transparent substrate; (b) a binder polymer coated on the substrate; and (c) particles of an antistatic component, said particles being present on at least the surface of the binder polymer coating, wherein the binder polymer and the antistatic particles are present as a mixture in a single layer, and wherein the index of refraction of the binder and the index of refraction of the antistatic component differ by no more than about ±0.01.

18. A recording sheet according to claim 17 wherein the index of refraction of the binder and the index of refraction of the antistatic component differ by no more than about ±0.005.

19. A recording sheet according to claim 15 wherein the antistatic component is selected from the group consisting of (1) starch, (2) cationic starch, (3) hydroxyalkylstarch, wherein alkyl has at least one carbon (4) gelatin, (5) alkyl celluloses and aryl celluloses, wherein alkyl has at least one carbon atom and wherein aryl has at least 6 carbon atoms, (6) hydroxy alkyl celluloses, wherein alkyl has at least one carbon atom, (7) alkyl hydroxy alkyl celluloses, wherein each alkyl has at least one carbon atom, (8) hydroxy alkyl alkyl celluloses, wherein each alkyl has at least one carbon atom, (9) dihydroxyalkyl cellulose, wherein alkyl has at least one carbon atom, (10) hydroxy alkyl hydroxy alkyl cellulose, wherein each alkyl has at least one carbon atom, (11) halodeoxycellulose, wherein halo represents a halogen atom, (12) amino deoxycellulose, (13) dialkylammonium halide hydroxy alkyl cellulose, wherein each alkyl has at least one carbon atom and wherein halide represents a halogen atom, (14) hydroxyalkyl trialkyl ammonium halide hydroxyalkyl cellulose, wherein each alkyl has at least one carbon atom and wherein halide represents a halogen atom, (15) dialkyl amino alkyl cellulose, wherein each alkyl has at least one carbon atom, (16) carboxyalkyl dextrans, wherein alkyl has at least one carbon atom, (17) dialkyl aminoalkyl dextran, wherein each alkyl has at least one carbon atom, (18) amino dextran, (19) carboxy alkyl cellulose salts, wherein alkyl has at least one carbon atom, (20) gum arabic, (21) carrageenan, (22) karaya gum, (23) xanthan, (24) chitosan, (25) carboxyalkyl hydroxyalkyl guar, wherein each alkyl has at least one carbon atom, (26) cationic guar,. (27) n-carboxyalkyl chitin, wherein alkyl has at least one carbon atom, (28) dialkyl ammonium hydrolyzed collagen protein, wherein alkyl has at least one carbon atom, (29) agar-agar, (30) cellulose sulfate salts, (31) carboxyalkylhydroxyalkyl cellulose salts, wherein each alkyl has at least one carbon atom, and (32) mixtures thereof.

20. A recording sheet according to claim 15 wherein the binder is selected from the group consisting of polyacrylic acid, poly (hydroxyalkyl methacrylates), wherein each alkyl has at least one carbon atom, poly (hydroxyalkylacrylates), wherein alkyl has at least one carbon atom, alkyl cellulose, wherein alkyl has at least one carbon atom, aryl cellulose, wherein aryl has at least six carbon atoms, hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, poly (vinyl butyral), cyanoethylated cellulose, cellulose acetate hydrogen phthalate, hydroxypropylmethyl cellulose phthalate, cellulose triacetate, poly (α-methylstyrene), styrene-butadiene copolymers, styrenebutylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly(2,6-dimethyl p-phenylene oxide), poly (2,4,6-tribromostyrene), ethylene-maleic anhydride copolymers, and mixtures thereof.

21. A recording sheet according to claim 15 wherein the antistatic component is selected from the group consisting of (1) starch, (2) cationic starch, (3) hydroxyalkylstarch, wherein alkyl has at least one carbon atom, (4) gelatin, (5) alkyl celluloses and aryl celluloses, wherein alkyl has at least one carbon atom and wherein aryl has at least 6 carbon atoms, (6) hydroxy alkyl celluloses, wherein alkyl has at least one carbon atom, (7) alkyl hydroxy alkyl celluloses, wherein each alkyl has at least one carbon atom, (8) hydroxy alkyl alkyl celluloses, wherein each alkyl has at least one carbon atom, (9) dihydroxyalkyl cellulose, wherein alkyl has at least one carbon atom, (10) hydroxy alkyl hydroxy alkyl cellulose, wherein each alkyl has at least one carbon atom, (11) halodeoxycellulose, wherein halo represents a halogen atom, (12) amino deoxycellulose, (13) dialkylammonium halide hydroxy alkyl cellulose, wherein each alkyl has at least one carbon atom and wherein halide represents a halogen atom, (14) hydroxyalkyl trialkyl ammonium halide hydroxyalkyl cellulose, wherein each alkyl has at least one carbon atom and wherein halide represents a halogen atom, (15) dialkyl amino alkyl cellulose, wherein each alkyl has at least one carbon atom, (16) carboxyalkyl dextrans, wherein alkyl has at least one carbon atom, (17) dialkyl aminoalkyl dextran, wherein each alkyl has at least one carbon atom, (18) amino dextran, (19) carboxy alkyl cellulose salts, wherein alkyl has at least one carbon atom, (20) gum arabic, (21) carrageenan, (22) karaya gum, (23) xanthan, (24) chitosan, (25) carboxyalkyl hydroxyalkyl guar, wherein each alkyl has at least one carbon atom, (26) cationic guar, (27) n-carboxyalkyl chitin, wherein alkyl has at least one carbon atom, (28) dialkyl ammonium hydrolyzed collagen protein, wherein alkyl has at least one carbon atom, (29) agar-agar, (30) cellulose sulfate salts, (31) carboxyalkylhydroxyalkyl cellulose salts, wherein each alkyl has at least one carbon atom, and (32) mixtures thereof, and the binder is selected from the group consisting of polyacrylic acid, poly (hydroxyalkyl methacrylates), wherein each alkyl has at least one carbon atom, poly (hydroxyalkylacrylates), wherein alkyl has at least one carbon atom, alkyl cellulose, wherein alkyl has at least one carbon atom, aryl cellulose, wherein aryl has at least six carbon atoms, hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, poly (vinyl butyral), cyanoethylated cellulose, cellulose acetate hydrogen phthalate, hydroxypropylmethyl cellulose phthalate, cellulose triacetate, poly (α-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly(2,6-dimethyl p-phenylene oxide), poly (2,4,6-tribromostyrene), ethylene-maleic anhydride copolymers, and mixtures thereof.

22. A recording sheet according to claim 1 wherein the binder polymer is present in a first layer and the antistatic particles are present in a second layer coated onto the first layer.

23. A recording sheet according to claim 22 wherein the first layer containing the binder is from about 1 to about 10 microns in thickness and the second layer containing the antistatic particles is from about 1 to about 5 microns in thickness.

24. A recording sheet according to claim 22 wherein the antistatic component has a melting point of about 70° C. or less.

25. A recording sheet according to claim 22 wherein the antistatic component has a melting point of about 50° C. or less.

26. A substantially transparent recording sheet which comprises (a) a substantially transparent substrate; (b) a binder polymer coated on the substrate; and (c) particles of an antistatic component, said particles being present on at least the surface of the binder polymer coating,- wherein the binder polymer is present in a first layer and the antistatic particles are present in a second layer coated onto the first layer, and wherein the antistatic component is selected from the group consisting of (1) benzyl dimethyl tetradecyl ammonium chloride dihydrate, (2) benzyl dimethyl stearyl ammonium chloride monohydrate, (3) cetyl pyridinium bromide monohydrate, (4) dodecyl pyridinium chloride monohydrate, (5) hexadecyl tributyl phosphonium bromide, (6) 1,12diaminododecane, (7) stearyl tributyl phosphonium bromide, (8) benzyl dodecyl dimethyl ammonium bromide, (9) tetrabutyl ammonium chloride hydrate, (10) 1,8-diamino octane, (11) benzyl cetyl dimethyl ammonium chloride monohydrate, and (12) mixtures thereof.

27. A recording sheet according to claim 22 wherein the binder is selected from the group consisting of cationic styrene-butadiene latexes, anionic styrene-butadiene latexes, nonionic styrene-butadiene latexes, ethylene-vinylacetate latexes, vinyl acetate-acrylic copolymer latexes, styrene-maleic anhydride copolymers, vinyl alkyl ether-maleic anhydride copolymers, wherein alkyl has at least one carbon atom, alkylene-maleic anhydride copolymers, wherein alkylene has at least one carbon atom, butadiene-maleic acid copolymers, vinylalkylether-maleic acid copolymers, wherein alkyl has at least one carbon atom, alkyl vinyl ether-maleic acid esters, wherein alkyl has at least one carbon atom, polyacrylic acid, poly (hydroxyalkyl methacrylates), wherein alkyl has at least one carbon atom, poly (hydroxyalkylacrylates), wherein alkyl has at least one carbon atom, poly(vinyl butyral), alkyl cellulose, wherein alkyl has at least one carbon atom, aryl cellulose, wherein aryl has at least six carbon atoms, poly (vinylacetate), hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has at least six carbon atoms, cellulose-acrylamide adducts, cyanoethylated cellulose, cellulose acetate hydrogen phthalate, hydroxypropylmethyl cellulose phthalate, cellulose triacetate, poly (α-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly (2,6-dimethyl p-phenylene oxide), poly (2,4,6-tribromostyrene), and mixtures thereof.

28. A substantially transparent recording sheet which comprises (a) a substantially transparent substrate; (b) a binder polymer coated on the substrate; and (c) particles of an antistatic component, said particles being present on at least the surface of the binder polymer coating,- wherein the binder polymer is present in a first layer and the antistatic particles are present in a second layer coated onto the first layer, and wherein the antistatic component is selected from the group consisting of (1) benzyl dimethyl tetradecyl ammonium chloride dihydrate, (2) benzyl dimethyl stearyl ammonium chloride monohydrate, (3) cetyl pyridinium bromide monohydrate, (4) dodecyl pyridinium chloride monohydrate, (5) hexadecyl tributyl phosphonium bromide, (6) 1,12diaminododecane, (7) stearyl tributyl phosphonium bromide, (8) benzyl dodecyl dimethyl ammonium bromide, (9) tetrabutyl ammonium chloride hydrate, (10) 1,8-diamino octane, (11) benzyl cetyl dimethyl ammonium chloride monohydrate, and (12) mixtures thereof, and the binder is selected from the group consisting of cationic styrene-butadiene latexes, anionic styrene-butadiene latexes, nonionic styrene-butadiene latexes, ethylene-vinylacetate latexes, vinyl acetate-acrylic copolymer latexes, styrene-maleic anhydride copolymers, vinyl alkyl ether-maleic anhydride copolymers, wherein alkyl has at least one carbon atom, alkylene-maleic anhydride copolymers, wherein alkylene has at least one carbon atom, butadiene-maleic acid copolymers, vinylalkylether-maleic acid copolymers, wherein alkyl has at least one carbon atom, alkyl vinyl ether-maleic acid esters, wherein alkyl has at least one carbon atom, polyacrylic acid, poly (hydroxyalkyl methacrylates), wherein alkyl has at least one carbon atom, poly (hydroxyalkylacrylates), wherein alkyl has at least one carbon atom, poly(vinyl butyral), alkyl cellulose, wherein alkyl has at least one carbon atom, aryl cellulose, wherein aryl has at least six carbon atoms, poly (vinylacetate), hydroxyalkyl cellulose acrylates, wherein alkyl has at least one carbon atom, hydroxyaryl cellulose acrylates, wherein aryl has at least six carbon atoms, hydroxyalkyl cellulose methacrylates, wherein alkyl has at least one carbon atom, hydroxyaryl cellulose methacrylates, wherein aryl has least six carbon atoms, cellulose-acrylamide adducts, cyanoethylated cellulose, cellulose acetate hydrogen phthalate, hydroxypropylmethyl cellulose phthalate, cellulose triacetate, poly (α-methylstyrene), styrene-butadiene copolymers, styrene-butylmethacrylate copolymers, vinyl chloride-vinylacetate-vinyl alcohol terpolymers, poly(p-phenylene ether-sulfone), polysulfones, aromatic ester carbonate copolymers, polycarbonates, α-methylstyrene-dimethylsiloxane block copolymers, dimethyl siloxane-bisphenol A carbonate block copolymers, poly (2,6-dimethyl p-phenylene oxide), poly (2,4,6-tribromostyrene), and mixtures thereof.

* * * * *